United States Patent
Funakubo

[15] 3,653,985
[45] Apr. 4, 1972

[54] PROCESS FOR THE MANUFACTURE OF A BAND SAW

[72] Inventor: Toshiei Funakubo, 3-19, Fukagawa Takabashi, Koto-ku, Tokyo, Japan

[22] Filed: Dec. 3, 1969

[21] Appl. No.: 881,845

[30] Foreign Application Priority Data

Dec. 9, 1968 Japan..................................43/89531

[52] U.S. Cl....................................148/127, 76/112, 148/34
[51] Int. Cl. ..........................................................C21d 9/24
[58] Field of Search ................29/95; 148/127, 34, 134, 143, 148/1; 76/112; 143/133; 219/10.41, 10.43, 10.57, 10.61, 77, 78, 101, 104, 121

[56] References Cited

UNITED STATES PATENTS

| | | | |
|---|---|---|---|
| 2,162,229 | 6/1939 | Remington | 148/127 |
| 3,034,379 | 5/1962 | Bernstein et al. | 76/112 |
| 1,217,095 | 2/1917 | Krump | 148/147 X |
| 1,503,310 | 7/1924 | Ericson | 76/112 |
| 1,921,039 | 8/1933 | Remington | 76/112 |
| 2,445,150 | 7/1948 | Mueller | 148/127 X |
| 3,089,945 | 5/1963 | Connoy et al. | 76/112 X |
| 3,315,548 | 4/1967 | Anderson et al. | 76/112 |

*Primary Examiner*—Charles N. Lovell
*Attorney*—Shlesinger, Fitzsimmons & Shlesinger

[57] ABSTRACT

A novel process for the manufacture of a metal- or wood-cutting band saw having a uniform structure and mechanical strength and sufficiently flexible to pass over two wheels on a conventional sawing equipment without breaking along the line of weld in the course of metal- or wood-cutting operations.

For the manufacture of such a band saw, a series of saw teeth are formed on one edge of cutting edge of an elongated steel band adapted for serving as a band saw. The steel band is then cut to a predetermined length and the cut material is welded at the two ends directly without any solder therebetween. The steel band saw is then quenched and tempered as a whole to obtain an even temper, and the front or cutting edge of the band is quenched and tempered as usual for hardening the saw teeth.

4 Claims, No Drawings

PROCESS FOR THE MANUFACTURE OF A BAND SAW

This invention relates to a process for the manufacture of a band saw.

According to the conventional process for the manufacture of a band saw, a series of teeth or projections are formed on one edge of an elongated steel hoop or band of a suitable width adapted for serving as a band saw. The teeth or projections are given any desired set pattern and the front or cutting edge of the hoop or band thus obtained is quenched and tempered in known manner for hardening the saw teeth. Thereafter, the hoop or band is cut to the desired length taking into account the distance between the driving and driven wheels on the sawing equipment. The cut material is then soldered or welded by a resistance welding method such as plasma or flash welding together at the two ends without any solder therebetween so as to provide a continuous band and annealed along the line of weld.

The conventional process as above described may be diagrammatically represented by the following flow sheet:

Toothing operation and teeth-bending or -setting operation—quenching and tempering of the front or cutting edge—cutting the hoop or band to the desired length—welding of the two ends of the cut material—annealing the line of weld.

The conventional process as above described, however, had a serious drawback that the properties of steel were changed by the high welding heat and the band saw might not be given the desirable flexibility and the uniform mechanical strength and tenacity particularly around the weld joint.

It was experienced that the band saw thus prepared was liable to break along the line of weld when subjected to the considerable tensile and bending moments accompanying the metal- or wood-cutting operations. In effect, the process of welding even followed by annealing affects the structure of the band saw in such a way that the weld line is hardened and less ductile and, on the contrary, the parts adjoining thereto are considerably softened, as compared with the remaining parts of the saw band.

It is the main object of the present invention to provide a novel process for the manufacture of a band saw provided with an even temper and sufficiently flexible to withstand the considerable bending and tensile moments accompanying the metal- or wood-cutting operations without the fear of breakage along the line of weld.

In the copending patent application filed on the same date with the present application, Ser. No. 881,835, the present inventor has proposed a novel process for the manufacture of a band saw wherein the drawbacks inherent in the aforementioned conventional manufacturing process may be obviated to a more or less extent. According to the process disclosed by the aforesaid patent application, the band saw welded at its two ends is quenched and tempered in the order along the relatively narrow zone covering the line of weld and the narrow parts adjoining thereto. When processed in the aforementioned manner, the band saw may have uniform mechanical strength and the transition in the steel structure caused to exist in the course of welding may be obviated to a considerable extent. The process just described provides a marked improvement over the prior art in that the properties of the band saw proper to the steel material may be recovered at the line of weld, and thus the steel structure of the band saw may be rendered more uniform than in the case of the conventional prior process. However, it is a matter of difficulty that the band saw should be quenched and tempered precisely along the aforementioned relatively narrow zone of the band saw and consequently the desired uniform mechanical strength of the saw band could not always be attained by the process disclosed in the aforesaid patent application.

The present inventor has found that the desired properties of the band saw, viz., the flexibility and the tenacity of the uniform steel structure of the band saw, could be more advantageously attained when the band saw welded together directly at the two ends without any solder therebetween by resistance welding was quenched as a whole from a certain temperature and tempered as a whole from a certain temperature below the critical temperature of the steel material used for the manufacture of the band saw.

According to the present invention, the resistance welded product may be quenched from the temperature between 750° to 920° C. and the quenched product may be tempered in a relatively short period of time by reheating it to the temperature between 450° to 560° C., depending on the properties of the steel materials used for the manufacture of the band saw. Following the aforementioned heat-treatment, the front or cutting edge of the band saw is quenched and tempered in known manner for hardening the saw teeth.

The novel process according to the present invention may be diagrammatically represented by the following flow sheet:

Cutting the hoop or band to the desired lengths—toothing operation and the teeth-bending or -setting operation— welding by a high heat of the two ends of the cut hoop or band into a continuous band without any solder therebetween— quenching and tempering of the thus obtained band as a whole—heat treating the front or cutting edge alone.

In the following numerical examples, the band saw is adapted for cutting steel materials and carbon tool steel, alloy tool steel or high-speed tool steel were used for the manufacture of the band saw. It is to be noted that any other materials may naturally be employed providing that the temperature used for the heat-treatment should be selected suitably according to the type of the materials employed for the manufacture of the band saw. In the following examples, a series of saw teeth were formed on the cutting edge of the band by relying upon the conventional toothing operation and teeth-bending operation. The saw band thus provided with saw teeth and welded at its two ends was placed on a turntable and heated by passing over a flame or by using the so-called high-frequency heating. The band saw thus heated was then submerged in oil for quenching.

EXAMPLE 1

A band of carbon tool steel model SK–2 (carbon content: 1.10 to 1.30 percent - Japanese Industrial Standard, as amended 1953 and 1956) was cut to a predetermined length and series of saw teeth were formed on the one edge of the cut material by relying upon the conventional toothing operation and teeth-bending or -setting operation. The two ends of the cut material were welded together by using plasma jets.

The band saw thus obtained was heated as a whole to a temperature between 750° and 800° C. and quenched. Thereafter, the thus quenched band saw was tempered as a whole by heating it to a temperature between 450° and 500° C. Following the aforementioned heat-treatment, the front or cutting edge of the band saw alone was quenched and tempered as usual for hardening the saw teeth to the desired degree.

The thus obtained product was cut transversely to the weld line and observed by using a microscope and an electron microscope. According to such observation, it was discovered that there was substantially no recognizable change in the steel structure adjacent to the jointed part and at the remaining parts of the band saw. It was also discovered as a result of a tensile test that the tensile strength of the band saw prepared by the present process was far superior to that of the band saw prepared by the prior process.

EXAMPLE 2

A band of carbon tool steel model SK–7 (carbon content: 0.60 to 0.70 percent) - Japanese Industrial Standard, as amended 1953 and 1956) was cut to a predetermined length and a series of saw teeth were formed on the one edge of the cut material by relying upon the conventional toothing operation and the teeth-bending or -setting operation. The two ends of the cut material were welded together by flash butt welding.

The band saw thus prepared was heated as a whole to a temperature between 780° and 820° C. and quenched. Thereafter, the thus quenched band saw was tempered as a whole for a relatively short period of time by heating it to a temperature between 450° and 500° C. Following the aforementioned heat-treatment, the front or cutting edge of the band saw was alone quenched and tempered as usual for hardening the saw teeth.

The band saw thus obtained was cut transversely to the weld line and the section thus obtained was observed by using a microscope and an electron microscope. According to such observation, it was discovered that there was substantially no noticeable change in the steel structure of the band saw adjacent to the jointed part and at the remaining parts of the band saw. It was also discovered, as a result of a tensil test that the tensile strength of the band saw prepared by the present process was far superior to that of the band saw prepared by the prior processes.

EXAMPLE 3

A band of special tool steel model SKS–51 (carbon content: 0.75 to 0.85 percent and nitrogen content: 1.30 to 2.00 percent - Japanese Industrial Standard, as amended 1953 and 1956) was cut to a predetermined length and a series of saw teeth were formed on the one edge of the cut material by relying upon the conventional toothing operation and the teeth-bending or -setting operation. The two ends of the cut material were welded together by using plasma jets. The band saw thus obtained was then heated as a whole to a temperature around 850° C. and quenched. Thereafter, the thus quenched band saw was tempered as a whole by heating it to a temperature between 450° and 550° C. Following the aforementioned heat-treatment, the front or cutting edge of the band saw alone was heat treated as usual for hardening the saw teeth.

The band saw thus obtained was cut transversely to the weld line and the section thus obtained was observed by using a microscope and an electron microscope. It was discovered by such observation that there was no noticeable change in the steel structure of the band saw adjacent to the jointed part and at the remaining parts of the saw band. It was also discovered as a result of the tensile test that the tensile strength of the band saw was far superior to that of the band saw prepared by the conventional processes.

EXAMPLE 4

A band of high-speed tool steel model SKH–9 (carbon content: 0.80 to 0.90 percent - Japanese Industrial Standard, as amended 1953 and 1956) was cut to a predetermined length and a series of saw teeth were formed on the one edge of the cut material by relying upon the conventional toothing operation and the teeth-bending or -setting operation. The two ends of the cut material were welded together by flash butt welding.

The band saw thus obtained was heated as a whole to a temperature between 870° and 920° C. and quenched. Thereafter, the thus quenched band saw was tempered by heating it to a temperature between 550° and 560° C. Following the heat-treatment as above described, the front or cutting edge of the band saw alone was quenched and tempered as usual for hardening the saw teeth.

The band saw thus obtained was cut transversely to the weld line and the section thus obtained was observed by using a microscope and an electron microscope. According to such observation, it was discovered that there was substantially no noticeable change in the steel structure of the band saw adjacent to the jointed part and at the remaining parts of the band saw. It was also discovered as a result of the tensile test that the tensile strength of the band saw prepared by the present process was far superior to that of the band saw prepared by the prior processes.

What is claimed is:

1. A process for the manufacture of a band saw comprising cutting a steel strip and forming therefrom an elongated hoop of a predetermined length; forming a series of teeth on one edge of the hoop; welding the two ends together without any solder therebetween into a continuous band; quenching the thus formed and welded band saw as a whole at a temperature between 750° and 920° C. tempering the band saw as a whole by reheating it to a temperature between 450° and 560°; and then successively quenching and tempering the front or cutting teeth edge alone.

2. A process for the manufacture of a band saw as claimed in claim 1, wherein carbon tool steel with a carbon content of 0.6 to 1.3 percent is used as the steel material and the welded product is quenched as a whole at a temperature between 780° and 850° C. and tempered as a whole at a temperature between 450° and 560° C., depending on the carbon content of the steel material.

3. A process for the manufacture of a band saw as claimed in claim 1, wherein special tool steel with a carbon content of 0.75 to 0.85 percent is used as the steel material and the welded product is quenched as a whole at the temperature around 850° C. and tempered as a whole at a temperature between 450° and 550° C.

4. A process for the manufacture of a band saw as claimed in claim 1, wherein high-speed tool steel with a carbon content of 0.80 to 0.90 percent is used as the steel material and the welded product is quenched as a whole at a temperature between 870° and 920° C. and tempered as a whole at a temperature between 550° and 560° C.

* * * * *